United States Patent [19]
Schiff et al.

[11] Patent Number: 4,673,269
[45] Date of Patent: Jun. 16, 1987

[54] COMPACT MULTIPLE IMAGE CAMERA WITH COLOR FILTER WHEEL

[76] Inventors: Otto M. Schiff, 18026 Mann, Irvine, Calif. 92715; Vitolds Rikis, 25432 Marina Cir., Mission Viejo, Calif. 92691

[21] Appl. No.: 715,243

[22] Filed: Mar. 25, 1985

[51] Int. Cl.⁴ .............. G03B 29/00; G03B 1/00; G01D 9/42; H04N 5/84
[52] U.S. Cl. .................. 354/76; 354/124; 346/110 R; 358/244
[58] Field of Search .................. 354/75–80, 354/100, 105, 106, 109, 110, 120, 124; 358/244; 346/110 R; 355/60; 369/121, 125

[56] References Cited
U.S. PATENT DOCUMENTS

| | | | |
|---|---|---|---|
| 561,132 | 6/1896 | Roche . | |
| 1,657,270 | 6/1928 | Muller et al. . | |
| 2,016,217 | 10/1935 | Raguin | 88/24 |
| 2,040,280 | 5/1936 | Strecker | 88/24 |
| 2,319,789 | 5/1943 | Chambers | 178/5.2 |
| 2,350,892 | 6/1944 | Hewson | 88/16.4 |
| 2,530,023 | 11/1950 | Millais | 88/16.4 |
| 2,638,499 | 5/1953 | Evans | 178/5.4 |
| 2,760,404 | 8/1956 | King | 88/24 |
| 2,878,309 | 3/1959 | Christensen | 178/5.4 |
| 3,006,260 | 10/1961 | Smith et al. | 95/12 |
| 3,603,722 | 9/1971 | Graham | 178/5.2 R |
| 3,693,178 | 9/1972 | Braun et al. | 346/110 R X |
| 4,096,530 | 6/1978 | Plugge et al. | 358/244 |
| 4,191,962 | 3/1980 | Sramek | 346/110 R |
| 4,231,061 | 10/1980 | Freeman | 358/76 |
| 4,285,587 | 8/1981 | Schiff et al. | 354/124 |
| 4,305,098 | 12/1981 | Mitchell | 358/131 |
| 4,339,769 | 7/1982 | Fujita et al. | 358/244 X |
| 4,343,543 | 8/1982 | Schiff et al. | 354/124 |
| 4,438,453 | 3/1984 | Alston | 358/244 X |
| 4,488,244 | 12/1984 | Freeman | 358/244 X |

*Primary Examiner*—W. B. Perkey
*Attorney, Agent, or Firm*—Gausewitz, Carr & Rothenberg

[57] ABSTRACT

A compact multiple image camera sequentially exposes upon a film a number of images of a video monitor that displays pictures of a patient subjected to a scanning device. The video monitor and a folded optical system move transversely of the film, which itself is mounted for longitudinal motion to enable multiple exposures in different arrays on the film. To enable the making of color photographs of a color video image that is supplied to the black-and-white monitor, a filter disc bearing a number of color filter elements is rotatably mounted between the camera lens elements, and its motion is synchronized with the sequential feeding of individual video signal color components to the monitor and the blanking of the monitor so as to sequentially expose upon the film filtered images of the screen of the black-and-white monitor as it sequentially displays components of the different colors of the video color signal.

14 Claims, 7 Drawing Figures

COMPACT MULTIPLE IMAGE CAMERA WITH COLOR FILTER WHEEL

BACKGROUND OF THE INVENTION

The present invention relates to compact multiple image cameras and particularly concerns the making of color photographs with such a camera that incorporates a black-and-white video monitor.

Compact cameras of the type shown in our prior U.S. Pat. Nos. 4,285,587 and 4,343,543 have a number of advantages in production of photographic records, because of the ease of handling, compact size, and flexibility of operation. In the arrangement shown in these prior patents, a relatively small screen black-and-white video monitor is mounted in a housing, and a folded path optical system directs light from the monitor screen in a compact folded path arrangement to an output axis generally behind the screen and parallel to the screen face. The arrangement is efficient, effective and highly satisfactory for production of multiple image formats of a variety of types on black-and-white film.

In many situations, both in medical cameras where photographs are employed for patient diagnosis or diagnostic records, and in computer-controlled displays where a computer produces a graphic display upon a monitor screen, a photographic record in color, rather than in black-and-white, is desired. Preferably, in order to make a photographic color record, a small screen color video monitor would be employed instead of the black-and-white monitor. However, because of the nature of the video color monitor, high resolution is difficult to achieve on a small screen, and many situations require use of a smaller video monitor, which would provide an unacceptably low resolution if in color. Accordingly, a small size, high resolution black-and-white video monitor may be sequentially fed with different color components of a color video signal, and a color film may be sequentially exposed, through different color filters, to thDe image provided by the several color components of the black-and-white screen. The several color component black-and-white images are superimposed, one upon the other, upon the color film. In this manner, a satisfactory color photograph of a picture defined by a color video signal is obtained with the use of a black-and-white video monitor of high resolution.

In some prior black-and-white monitor color photograph systems color filters are positioned between the video monitor screen and the camera lens, and each filter is slidably shifted into and out of position by the use of individual solenoid motors. Such an arrangement is bulky and complex, requiring a large package for a combined monitor and camera. The large size filters and their required large drives are relatively expensive, more difficult to operate and control, and are totally incompatible with a small size compact camera.

Accordingly, it is an object of the present invention to provide a small size, compact multiple image color camera employing a black-and-white video monitor for making color photographs.

SUMMARY OF THE INVENTION

In carrying out principles of the present invention in accordance with a preferred embodiment thereof, a compact multiple image camera includes a housing, a black-and-white video monitor in the housing, optical means for transmitting light from the monitor screen along a folded optical path having an output axis behind the screen, the optical means including a lens having a plurality of elements, a filter assembly having a rotatably mounted disc extending between two of the lens elements, and having a plurality of circumferentially spaced filter elements adapted to be selectively positioned between the two lens elements as the disc rotates, means for rotating the disc, means for supporting film perpendicular to the optical path output axis, and means for effecting relative displacement of the film and monitor perpendicular to the output axis. Rotatio of the filter disc is monitored and employed to control energization of the video monitor screen, and exposures of the screen with the respective color components of the video signal are individually timed to control color component exposure and shifting of the color filter disc to its next position. The folded optical path includes a slidable mirror that can be transversely displaced to direct the optical path from the monitor screen to a separate detachably connected camera module of different format having its own lens and color filter disc system.

DETAILED DESCRIPTION OF THE INVENTION

A multiple image color camera embodying principles of the present invention is adapted to rest upon a tabletop or other comparable horizontal support and to have all of its parts within a camera housing package that is not much greater in each of three dimensions than the included video monitor that provides the display of which the multiple photographic images are to be made. According to the present invention, the camera uniquely enables color photographing of a color video display presented to a small, high-resolution, black-and-white video monitor. Control electronics are provided to correlate the sequential activation of the video monitor screen with the video color signal components and the movement of a small disc filter. The use of a small disc filter between the lens elements provides a number of advantages. It permits the use of sequential color photography in a small-size, highly compact multiple image camera package. It provides optimum positioning of the color filters. It enables rapid and precision control and synchronization of the color filter movement. The camera arrangement, moreover, enables a similar between-the-lens color filter disc to be employed in readily attachable/detachable auxiliary camera module to enable color photographs of the same video monitor with camera backs of different formats.

Figures 1, 4:
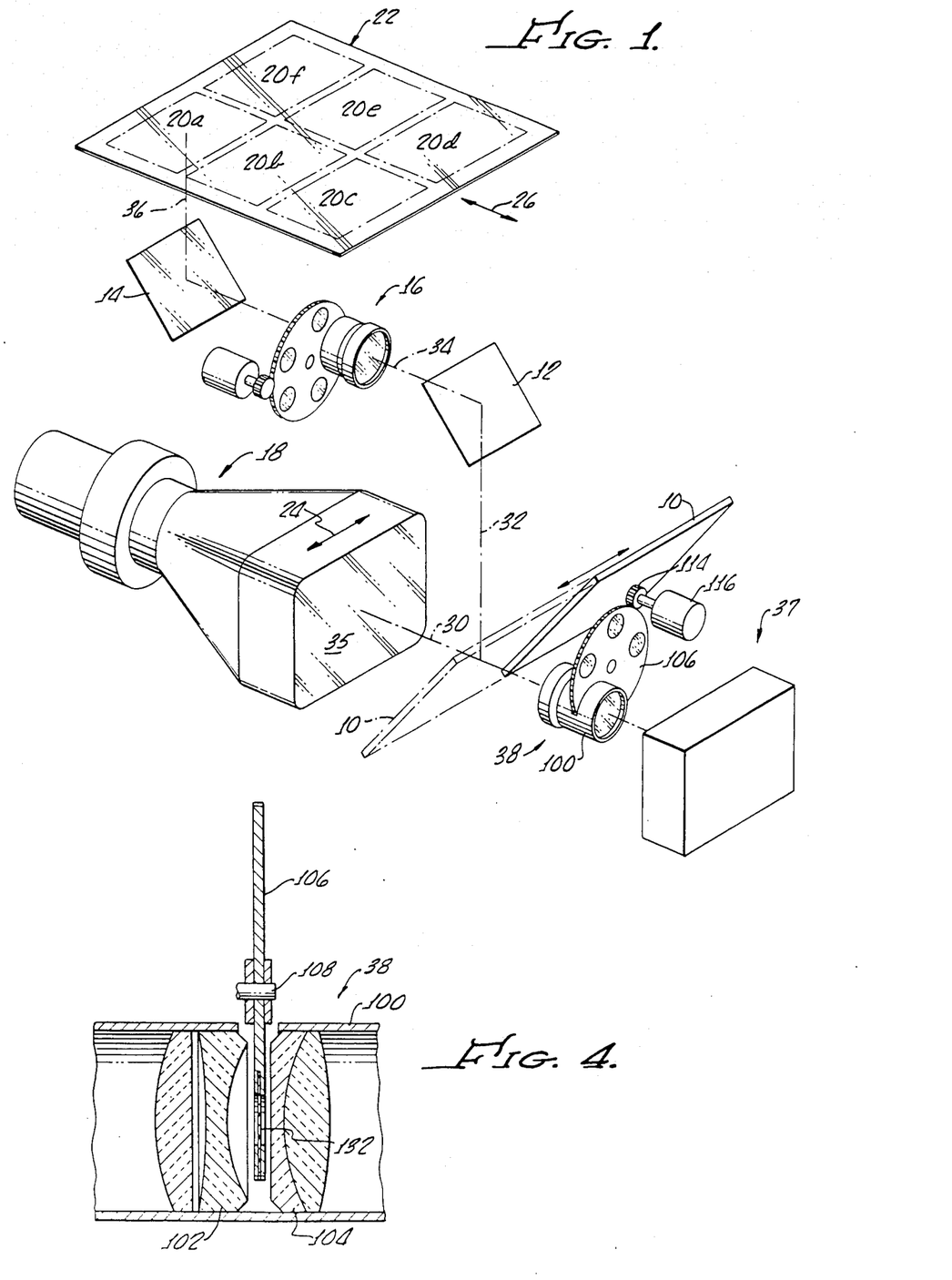
FIG. 1 is a schematic perspective of major components of a compact multiple image color camera embodying principles of the present invention.
FIG. 4 illustrates details of a lens having a color filter disc mounted between the elements thereof.

As illustrated in FIG. 1, a folded optical path including three mirrors 10, 12 and 14 and an interposed lens and filter assembly 16 is provided in an optical system that is fixedly mounted to a video monitor 18 so as to pass the image of a display on the face of the monitor to a selected one of a number of areas 20a, b, c, d, e, or f on a sheet 22 of film held in a film transport (not shown in FIG. 1). The optical system and video monitor are mounted in a camera housing (not shown in FIG. 1) for bidirectional transverse motion, as indicated by the arrow 24, and the film, in its transport, is mounted for bidirectional motion in a longitudinal direction, as indicated by arrow 26, relative to the camera housing and relative to the oscilloscope and optical system. The monitor, schematically indicated at 18, is a relatively small size, high resolution black-and-white oscilloscope longitudinally elongated in the direction of arrow 26. Mirrors 10, 12 and 14 are spaced and oriented to provide a folded optical path having a first horizontal leg 30, a second horizontal leg 32, a third rearwardly-directed horizontal leg 34, and an output axis or output leg 36 directed vertically upwardly and positioned rearwardly of, and generally parallel to, the screen 35 of the monitor 18. Accordingly, the monitor and its optical system may be moved transversely relative to the camera housing, and the film may be moved longitudinally relative to the camera housing to center the output optical leg 36 on any one of the film areas of the film 22 so as to enable exposure of six different images on the film in the illustrated format. It will be readily understood that the illustrated six image format is merely exemplary of many that may be employed. The monitor is shown oriented with a longer dimension of its screen horizontal and with a folded optical path arranged to bend upwardly and over the top of the monitor. Obviously, other arrangements and orientations may be employed, with the monitor turned at 90°, for example, and the optical path bent around either side, top or bottom of the monitor to provide the rearwardly-positioned output optical axis. Although the described arrangement is preferred for optimum decrease of overall camera size, it will be readily appreciated that the multi image format can also be achieved by a configuration in which either one of the film or the monitor (and optical system) is held fixed and the other made movable both transversely and longitudinally.

Figure 2:
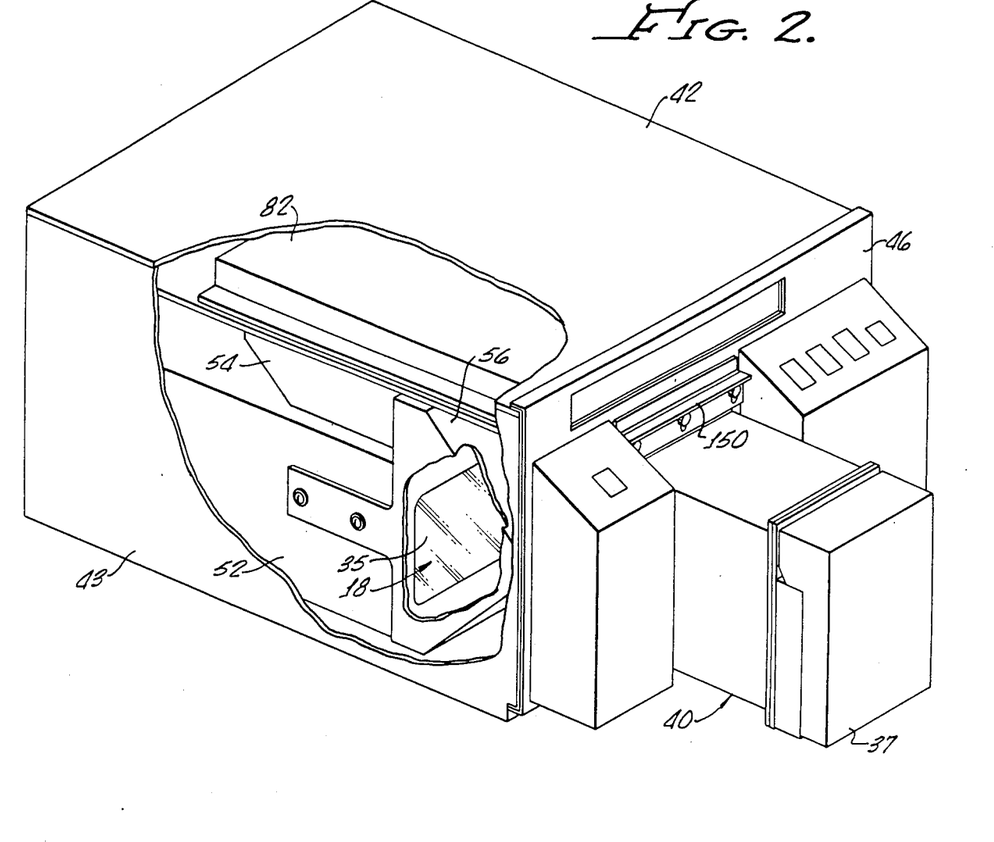
FIG. 2 is a pictorial view of a compact multiple image camera including the elements of FIG. 1.

The camera schematically illustrated in FIG. 1 includes an auxiliary camera module having a camera back 37 of a suitable format and its own lens and filter system 38, which may be substantially identical to the lens and filter system 16. The lens and filter system 38 and camera back 37 are mounted in an auxiliary camera module housing 40 (FIG. 2) that is arranged to be detachably connected to the housing of the video monitor and folded optical path system. Mirror 10 is slidably mounted for transverse motion to and from a first position, illustrated in dotted lines in FIG. 1, wherein the mirror operates to reflect light received along optical path 30, at right angles along optical path leg 32, to the mirror 12. Thus, an image of the screen may be photographed on the film 22. For use of the auxiliary camera module 37, 38, mirror 10 is slid to a second position, shown in solid lines, in which the optical path leg 30 completely bypasses the mirror and strikes the aligned lens and filter system 38 of the auxiliary camera module. The auxiliary camera module may use a camera back format of any of many different types, such as 4×5, 8×10, Polaroid SX-70, or 35 mm.

The components schematically illustrated in FIG. 1 are shown in FIGS. 2, 3, 5 and 6 as mounted in a lightweight compact camera housing having a bottom 41, a top 42, sides 43 and 44, back 45 and a front panel 46. A video monitor and optical housing includes a substantially rectangular monitor mounting section 52, a rectangular lens and exposure aperture section 54 above the monitor, and a truncated pyramidal optical turning section 56 between the front of the monitor and the front panel of the housing. Mirrors 10 and 12 are mounted in section 56 of which a wall 55 is formed with an aperture 57 which provides an optical path from the monitor screen to the auxiliary camera module when the mirror 10 is laterally displaced. A pair of transversely extending rods 58, 59 are fixedly mounted in the optical housing section 56 above and below the opening 57 of wall 55, and a plurality of guide brackets 60, 61, 62 (FIG. 5) are fixed to the upper and lower edges of mirror 10 and suitably apertured to slidably receive the guide rods 58, 59. By means of this mounting, the mirror 10 may be slidably displaced from an operative position in the folded optical path to a position removed from the optical path. In the latter position, the auxiliary camera module can directly view the face of the monitor screen. An angulated operating handle 63 is fixed to the back of the mirror 10 to enable it to be manually slid between its operative positions. A stop pin 64 extends rearwardly of the mirror to engage edges of the opening 57 and thus limit the mirror positions. The stop pin also helps position the mirror in its two different positions.

Figure 3:
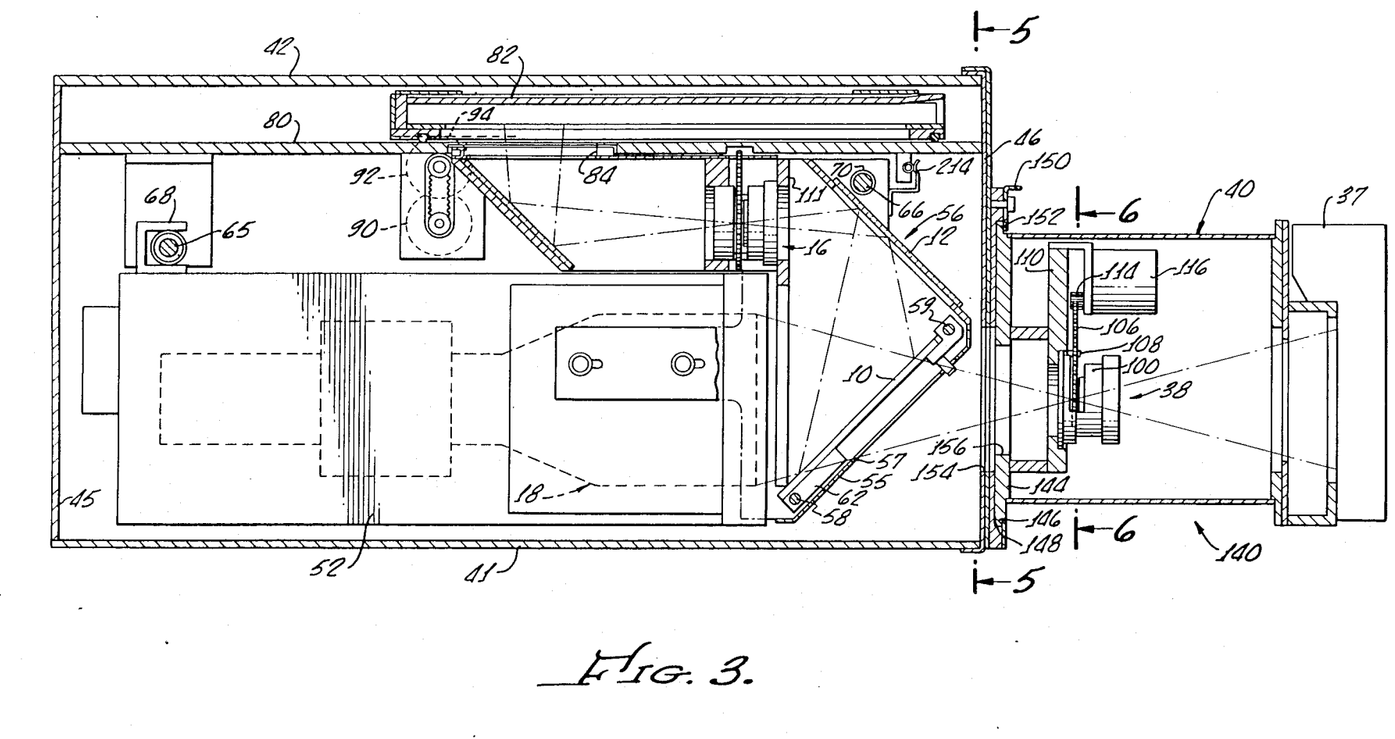
FIG. 3 is a longitudinal elevational section of the camera illustrated in FIG. 2.
Figure 5:
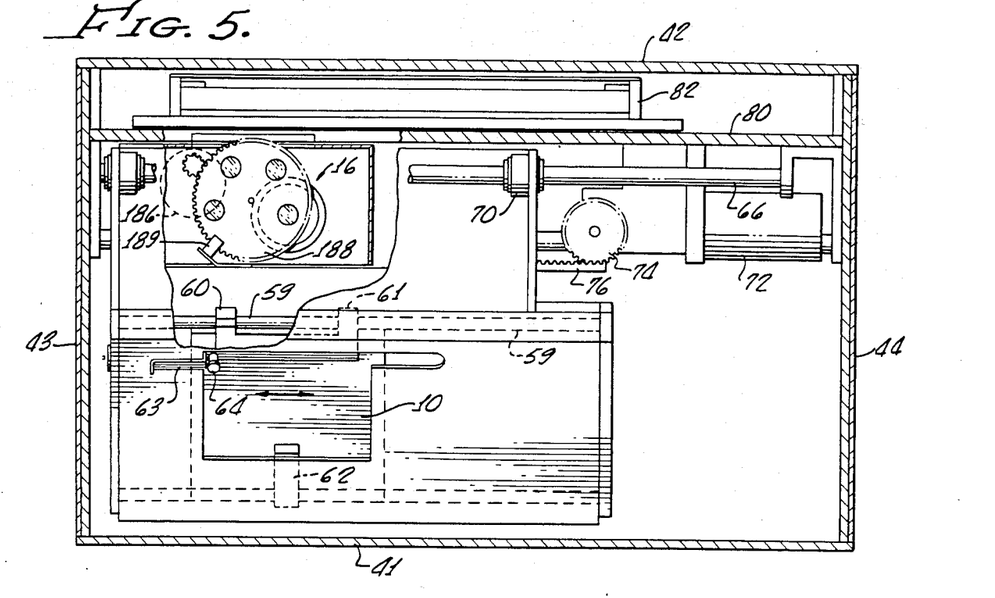
FIGS. 5 and 6 are sections taken on lines 5—5 and 6—6, respectively, of FIG. 3.

The monitor and housing are slidably mounted together for transverse motion within the camera housing on rods 65, 66 that are fixed to the camera housing and slidably received in brackets 68, 70 that are carried by the monitor and optical housing. A fixedly mounted motor 72 drives a gear 74, which engages a rack 76 fixed to the monitor and optical housing, to effect lateral displacement of the monitor and optical system within the camera housing.

A partition 80 extends completely across the camera housing, dividing it into a lower chamber, in which are mounted the video monitor and optical system, and an upper or film chamber, in which is mounted a slidable film carrier 82 that is driven longitudinally across a laterally elongated aperture 84 in partition 80. A film slide motor 90 drives a gear 92 journaled in the camera housing which meshes with a longitudinally-extending rack 94 fixed to the underside of the carrier 82, so as to drive the carrier longitudinally back and forth over the aperture 84 and relative to the output leg of the folded optical path. It will be understood that other arrangements may be employed for transport of the film, such as, for example, the roll film arrangement of U.S. Pat. No. 4,343,543.

Figure 6:
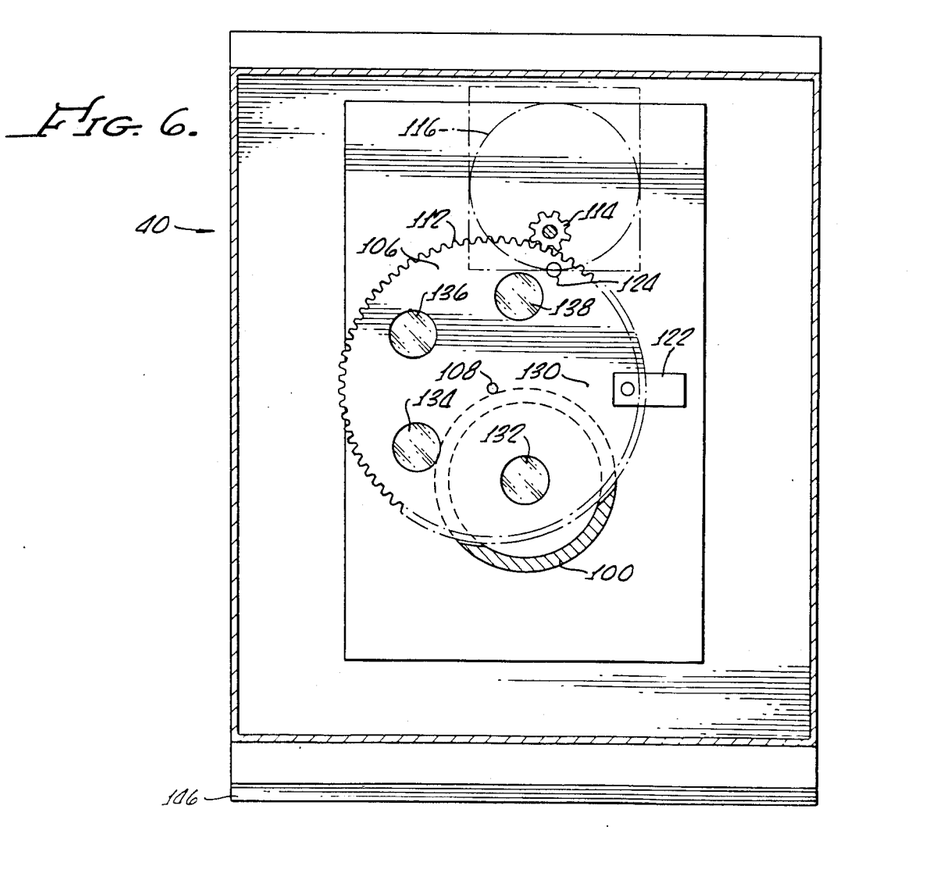

In order to make color photographs of the screen of a small, high-resolution black-and-white monitor, a plurality of separately operable color filters are interposed between the face of the monitor screen and the film. To maintain the advantages of the folded optical path compact arrangement of the described camera, a unique filter and lens assembly 16 is mounted to and movable with the optical housing and positioned in one of the optical path legs. The filter and lens assembly 16 is substantially identical to the filter and lens assembly 38 which is shown in FIGS. 4 and 6. Assembly 38 includes a lens sleeve 100 in which are mounted a plurality of lens elements, including a pair of axially spaced innermost elements 102, 104 which are mutually spaced, as is common in a multiple element lens, to provide an air space therebetween. The lens mounting sleeve 100 is slit to receive peripheral portions of a filter disc 106 mounted for rotation on a shaft 108 that is journaled in a lens support structure 110 that is mounted to the auxiliary module housing for assembly 38 (FIG. 3) and in a lens support structure 111 for the optical system housing for assembly 16.

Disc 106 is formed with a plurality of peripheral teeth 112, meshing with a gear 114 on the shaft of a stepper motor 116, that is also mounted to the housing. An optical home position sensor 122 (FIG. 6) is positioned to sense an aperture 124 adjacent the disc periphery to signal a home (or start) position of the disc when the disc aperture 124 is detected by the sensor 122. Conveniently, the sensor 122 includes a light-emitting diode on one side of the disc and a photosensitive diode on the other so that the light path between the sensor parts is blocked or not blocked by the disc and aperture 124 for the home position sensor. Stepper motor drive pulses are counted, starting at home position, to determine when the rotational position of the disc is correct for the proper positioning of the several filters.

Disc 106 is formed with five different circumferentially spaced areas, each of which may be individually positioned in axial alignment with the lens 38 at different rotational positions of the disc. The first of these areas is an opaque area 130 which is aligned with the lens when the disc is in home position, whereby the disc acts as a shutter or light-blocking device to prevent passage of light through the lens to film 22 (for assembly 16) when the camera is not operating. A second area is formed by a clear aperture 132 which is aligned with the lens (as illustrated in FIG. 6) when the camera is to be used for making black-and-white photographs. A third area 134 is formed by an aperture having a red filter element. Fourth and fifth areas 136, 138 are formed by apertures having green and blue filter elements, respectively. Accordingly, the disc may be rotated to a home position wherein passage of light through the lens is blocked, to a second position wherein element 132 passes unfiltered white light, to a third position in which filter element 134 passes only red light, to a fourth position in which filter element 136 pases only green light, and to a fifth position in which filter element 138 passes only blue light.

For greater versatility, the described compact multi-image camera is arranged to employ alternate photographic formats and thus is adapted to be connected to the auxiliary camera module 140 that, as previously mentioned, may be of any one of a number of different types of formats, such as 4×5, 8×10, Polaroid SX-70 or a 35 mm back, for example. The auxiliary camera module includes the auxiliary housing 40 at the rear of which is mounted the camera back 37 of the desired format and having a fixed front wall 144. The latter includes a lower transversely-extending lip 146 that fits into an upwardly-extending channel 148 formed at the lower edge of the front of the main camera housing front panel 46. A vertically slidable latch 150 mounted to the front panel 46 is movable downwardly into a locked position to overlie and latch an upwardly extending lip 152 formed on the upper edge of the front panel 144 of the auxiliary camera module housing. Front panel 46 of the main camera housing is formed with an aperture 154 aligned with an aperture 156 in the front of the auxiliary camera module and both are aligned with the monitor screen. The lens and filter assembly 38 is fixedly carried in the auxiliary module camera housing as described above.

The auxiliary camera module may be readily connected to and disconnected from the front of the main camera housing. When the auxiliary module is connected, the mirror 10 is slidably moved to a position offset from the optical path between the monitor screen and the auxiliary camera module lens assembly 38. Thus, color photographs of the face of the monitor screen may be made with the auxiliary camera. With the auxiliary camera module detached from the compact camera housing wall 46, mirror 10 is moved back into its operative position and light from the screen is transmitted, as previously described, along the folded optical path to the film mounted in the slidable carrier 82. It is important to note that the slidable motion of the mirror 10, which is necessary to displace the mirror for use of the auxiliary camera module, uniquely allows the use of the auxiliary module together with a compact camera package. If the mirror 10 were pivotally mounted for motion to a position displaced from the optical path between the auxiliary module and the screen, there would be required either a significantly larger camera package or a restriction on the amount of displacement of the mirror. Unless the mirror can be pivoted through more than 90°, the probability of unwanted reflections from the mirror being transmitted to the lens assembly 38 is increased. It is highly important that the mirror 10 be moved to a position in which the possibility of unwanted reflections from the mirror to the lens 38 is minimized. The described slidable mounting of the mirror 10 accomplishes this result and, at the same time, requires a minimum of additional space.

Figure 7:
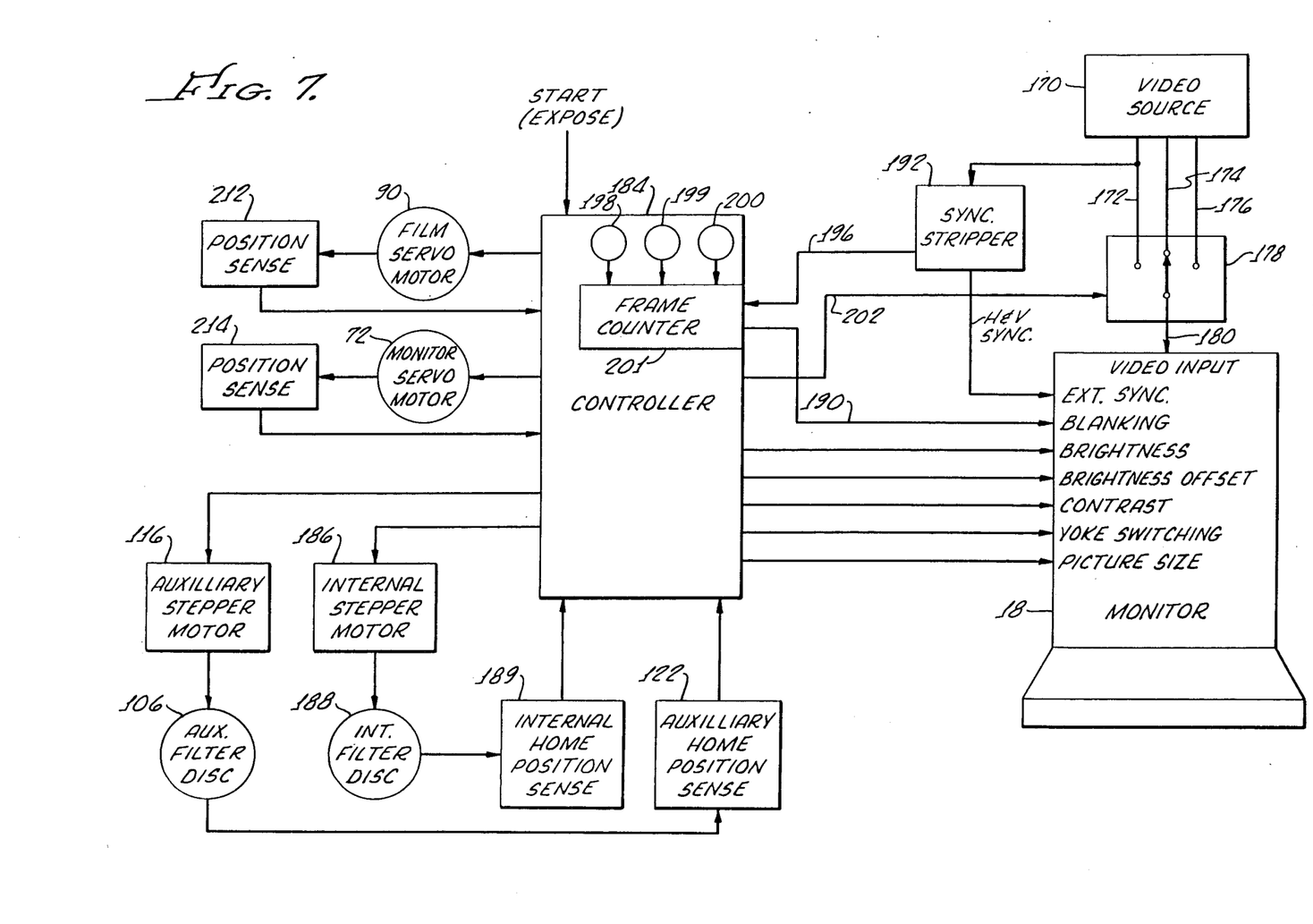
FIG. 7 is a block diagram of the interconnecting and synchronizing control between the video monitor and the filter wheel.

Illustrated in FIG. 7 is a block diagram of an electronic system that controls operation of the filter wheel and ensures synchronization of the filter wheel motion with the sequential activation of the monitor screen by the several color components of the video signal.

A video signal source 170, which may include video signals from a medical scanning device or a computer, separately stores the green, red, and blue signal components of individual video frames, so that the separate components of any given frame may be fed in sequence via lines 172, 174, 176 and a three position switch, schematically illustrated at 178, to an input line 180 of the video monitor 18. A controller 184, which includes a microprocessor, suitable memories, and related circuitry, controls a number of features and operations of the camera, including the control, sequencing, and synchronization of the filter wheel motion and video blanking. The latter is employed for exposure control of the indiviual color signal components.

A start command, which commands exposure of a selected video frame, is generated by pushing on an operator controlled start button (not shown) on controller 184. The internal filter disc 188 (of filter assembly 16) is initially in its home position, and this position is checked upon receipt of a start command. If the disc is not at home when the start command occurs, the disc stepper motor 186 is driven by a series of pulses from the controller until the home position aperture is at the position of the sensor 189 (for the internal filter assembly 16). With the disc in its home position, a predetemined number of drive pulses is sent to the motor 186 to cause the motor to drive the filter disc 188 of filter assembly 16 to position its red filter in alignment with the lens. Switch 178 is controlled so that the first (red) color component is fed to the video input and caused to scan the video screen in repetitive frames. The controller counts the filter motor drive pulses, and when a sufficient number of pulses for positioning the red filter has been transmitted, the video monitor, which has been blanked by a control signal on a line 190 from the controller, is caused to be unblanked for a preselected period of time. During this unblanked time, the disc drive maintains a fixed rotational position of the disc. In order to ensure that full video frames are exposed, the time of unblanking for each individual color is measured in integral numbers of frames. This is most conveniently achieved by use of a sync stripper 192 that selects horizontal and vertical sync signals from one of the color component signals on lines 172, 174, and 176, and feeds the vertical sync signal via a line 196 to the controller 184.

The controller includes a group of manually operated controls 198, 199 and 200 which are set by the operator to the individual exposure times of the respective color components. Setting each of the knobs 198–200, sets a number into the controller that is equal to the desired exposure time, as measured in an integral number of video storage frames, for the respective color filters. For each color component the preset exposure time is compared with the number in a video frame counter 201 of the controller. The counter 201 counts vertical sync pulses on line 196 until a number of frames has been displayed on the screen and counted equal to the number established for the selected exposure time for the first (red) color component. The controller then sends a blanking signal on line 190 to blank the video and terminate exposure of the first color. Upon this blanking of the monitor, additional drive pulses are fed to the stepper motor 186 and counted internally of the controller, until pulses have been transmitted in a number sufficient to rotate the disc and position the second color filter in alignment with the lens. The second color component is then fed to the video input of the monitor. The monitor unblanking and blanking is repeated for the second color component, again determining exposure time by counting a whole number of video frames and blanking the video at the end of the count. Then the disc 188 is driven to position the third color filter at the lens, and the video signal of the third color component is fed to the monitor video input. The screen is unblanked for the preselected exposure time for this color component, as determined by count of full video frames. At the end of this exposure time the monitor is again blanked, and the filter disc is then driven to its home position.

Switch 178 is operated together with the driving of the filter disc to its several positions by means of a switch control signal sent via a line 202 from the controller to the switch 178. Switch 178 is operated after each blanking and while the filter disc is being moved to its selected position. Accordingly, as the filter disc is being driven to position the first filter element in alignment with the lens, switch 178 is operated to connect the first color signal component on line 172 to the video input. Similarly, as the disc is driven to position the second color filter, the switch is driven to couple line 174 to the video input. For the third color filter the switch 178 is operated to feed the third color component, on line 176, to the monitor video input.

The controller provides a number of other signals for control of the camera, including signals for control of brightness, brightness offset, contrast, yoke switching, and picture size. Yoke switching provides for reversing the image on the video monitor by causing the video signal to either start at the bottom and run to the top, instead of from top to bottom, in its line by line sweep, or, in the alternative, to start at the right side of the screen and sweep to the left, instead of from left to right, as in the conventional monitor. The yoke switching will accordingly reverse the image on the monitor and provide a mirror image to account for the fact that the three-mirror optical path for exposing film in the carrier 82 will provide a reversed image, whereas the optical path for the auxiliary module 140 does not provide a reversed image. Thus, the yoke switching is employed to reverse the monitor image when the internal folded optical path is employed.

Control of picture size from the controller is provided for the purpose of varying the size of the full frame video image on the face of the monitor, so as to enable accommodation of different formats on the multiple image film. For example, the monitor image for each image in a 3×3 array is smaller than the monitor image for a 2×3 array. Also controlled by the controller 184 are the longitudinal position of the slidable film carrier and the transverse position of the monitor housing and folded optical system. Thus, the controller operates the film slide servo motor 90 which drives the slide carrier 82 forwardly and rearwardly. Slide carrier position is sensed by a position sensor 212 which sends a position feedback signal to the controller for closed loop control of the longitudinal position of the carrier. Similarly, transverse position of the optical system and monitor housing is controlled by the monitor servo motor 72 of which the position is detected by a position sensor 214 to provide a feedback for closed loop control of transverse position.

The controls for operation of the monitor, filter and lens assembly for auxiliary camera module 140 are duplicates of and provided in parallel with the controls for the corresponding operations for internal filter assembly 16. Thus, to operate the auxiliary filter assembly for the auxiliary camera module, the controller sends its stepping motor drive signal to the auxiliary stepper motor 116, which drives the filter disc 106, of which home position is sensed by the sensor 122. The stepper motor drives for the motor 116 are coordinated with the blanking and unblanking exposure control and the switching of video color components for the auxiliary module just as are the similar functions for the internal filter assembly previously described.

It is necessary that the exposure time for each of the separate color components be separately controlled because such exposure time may vary within a range of approximately 10 to 80 seconds for each color component. The required exposure time of the red component, for example may be considerably longer than the exposure time of either blue or green. The actual amount of exposure time for each of the components depends in part upon the screen brightness, the degree of magnification, and the lens aperture. As previously described, the exposure time for each component is readily computed and measured in the described arrangement by the frame counter 201 in the controller 184 which counts a preselected number of complete video scan frames by counting vertical sync pulses from stepper 192. The counted number of frames is compared in the controller with a color component exposure control time for the red component that is one of three control times set into the comparator by the manual controls 198, 199, 200.

In the home position, opaque area 130 of the filter disc is interposed between the lens elements, and the filter disc acts as a shutter to block passage of inadvertent and undesired light through the lens to the film 22. In this position of internal disc 188, the auxiliary module may be used to photograph the screen without adversely affecting film 22. When photographing the video face on black-and-white film, the filter disc is moved to place the clear aperture 138 between the lens elements under suitable control signals from the controller.

If deemed necessary or desirable, suitable electrical connectors can be provided between the auxiliary camera module and the compact camera housing to automatically connect the lens and filter assembly 38 to the controller when the auxiliary module is physically connected to the compact camera housing. Such connection may disable the connections between the controller and the lens filter assembly 16, if desired, although simultaneous operation of the two lens filter assemblies 16 and 38 has little adverse effect.

It will be readily appreciated that the filter lens assembly 16, which is shown as being positioned within leg 34 of the folded optical path, may be placed in other legs of the folded optical path. Position of the filter lens assembly is chosen in part by the amount of magnification required. Thus, where relatively little magnification is needed, as in multiple image array of six or nine images on a single sheet of film 22, the position illustrated in FIG. 1 may be employed. Where greater magnification is required, as where an array of only four images on the film 22 is to be provided, a greater magnification is needed, and the lens filter assembly may be positioned in leg 32 between the mirrors 10 and 12. Of course the described filter discs may have more or less components and operative areas than the five shown in the drawings.

It will be seen that there has been provided a multiple image compact camera having a uniquely positioned and uniquely arranged in the lens disc that provides rapid and precise sequential positioning of color filters and also provides both a clear passage and an opaque shutter-like position. Versatility of the compact camera arrangement is enhanced by modification of the folded optical path to allow attachment of an auxiliary camera module having a film back of different format.

The foregoing detailed description is to be clearly understood as given by way of illustration and example only, the spirit and scope of this invention being limited solely by the appended claims.

What is claimed is:

1. A compact multiple image camera comprising
  a housing,
  a video monitor in said housing having a screen forming images to be photographed,
  optical means mounted to said housing for transmitting light from the screen along a folded optical path having an output axis, said optical means comprising,
    a lens mounted in said optical path, said lens having a plurality of lens elements,
    a filter assembly having a rotatably mounted disc extending between two of said lens elements, said disc having a plurality of circumferentially spaced filter elements adapted to be selectively positioned between said two lens elements as the disc rotates,
  motor means for rotating the disc,
  means for supporting film in a plane perpendicular to said output axis and adjacent said monitor,
  means for effecting relative displacement of said film and said monitor perpendicular to said output axis, said optical means including a first mirror positioned in front of said screen for reflecting light from the screen in a direction substantially parallel to the screen, an auxiliary camera module, means for mounting said auxiliary camera module to said housing in position to photograph said video monitor screen, said mirror being interposed between said auxiliary camera module and said screen, and means for mounting said mirror to said housing for motion between a first position in which it reflects light from the monitor along said optical path in a direction generally parallel to said screen and in which the mirror blocks passage of light from the screen to said auxiliary camera module, and a second position in which the mirror does not interfere with passage of light from the screen to the auxiliary camera module.

2. The multiple image camera of claim 1 wherein said means for mounting the mirror comprises interengaging guide means on said mirror and housing for slidably guiding motion of said mirror into and out of said optical path.

3. The multiple image camera of claim 2 wherein said guide means comprises first and second spaced guide rods fixed to said housing and extending across said screen, slide brackets mounted at opposite edges of said mirror, said brackets having apertures slidably receiving said guide rods.

4. A compact multiple image camera comprising
  a housing,
  a video monitor in said housing having a screen forming images to be photographed,
  optical means mounted to said housing for transmitting light from the screen along a folded optical path having an output axis, said optical means comprising,
    a lens mounted in said optical path, said lens having a plurality of lens elements,
    a filter assembly having a rotatably mounted disc extending between two of said lens elements, said disc having a plurality of circumferentially spaced filter elements adapted to be selectively positioned between said two lens elements as the disc rotates, motor means for rotating the disc,
  means for supporting film in a plane perpendicular to said output axis and adjacent said monitor, and
  means for effecting relative displacement of said film and said monitor perpendicular to said output axis, including an auxiliary camera module mounted upon said housing and axially aligned with said video monitor to receive light from said video monitor screen, said optical means comprising a first mirror positioned adjacent said screen between the screen and said auxiliary camera module, said mirror being mounted for motion between a first position in which it reflects light from the screen in a direction generally parallel to the screen and blocks passage of light from the screen to the auxiliary camera module, and a second position in which the mirror does not interfere with passage of light from the screen to the auxiliary camera module.

5. The multiple image camera of claim 4 wherein said auxiliary camera module includes a lens having a plurality of lens elements, a second filter assembly having a second rotatably mounted disc extending between two of the lens elements of said auxiliary camera module, said second disc having a plurality of spaced filter elements adapted to be selectively positioned between the auxiliary module lens elements as the second disc rotates, at least one of said discs including an opaque area adapted to be positioned between the two associated lens elements so as to prevent passage of light throught the elements.

6. The multiple image camera of claim 5 wherein at least one of said discs includes a clear aperture adapted to be selectively positioned between the associated lens elements.

7. A multiple image camera comprising
a camera housing having a partition dividing said housing into first and second chambers, said partition having an elongated aperture,
a video monitor in said first chamber having an elongated body and a screen at a front end thereof, said screen facing the front of said housing and spaced rearwardly thereof,
an angulated optical housing fixed to said video monitor, said optical housing having a first section extending between said screen and the front of said camera housing and having a second section extending rearwardly from said first section between said video monitor body and said partition,
first and second inclined mirrors mounted in said first housing section for reflecting light from said screen in said first section and rearwardly from said first section along and through said second section,
a third inclined mirror mounted in said second section at a rear portion thereof for reflecting light through said partition aperture,
a lens interposed between two of said mirrors, said lens having a plurality of lens elements,
a filter wheel rotatably mounted in said optical housing, said filter wheel being positioned between elements of said lens and having a plurality of circumferentially spaced filter elements,
means for rotating said filter wheel to selectively position one of said filter elements between and in axial alignment with said lens elements,
means for effecting displacement of said film relative to said video monitor and optical housing, including an auxiliary camera module mounted to the front of said camera housing, said first inclined mirror being mounted in said camera housing for sliding motion from a first position interposed between said auxiliary camera module and said video monitor screen in which said first mirror reflects light from the screen toward said second mirror, and a second position in which light from said video monitor screen may pass freely to said auxiliary camera module.

8. The multiple image camera of claim 7 wherein said auxiliary camera module includes a lens having lens elements, a rotatably mounted filter wheel extending between said lens elements and having a plurality of spaced filter elements adapted to be selectively positioned between the lens elements as the filter wheel rotates, and means for rotating the filter wheel.

9. The multiple image camera of claim 8 wherein said auxiliary camera module has an optical axis aligned with the axis of said video monitor so that said auxiliary camera module may directly photograph the monitor screen when said first mirror is in said second position.

10. The multiple image camera of claim 9 including first and second mutually spaced guide bars extending laterally across the front of the camera housing and fixed thereto, said camera housing front having an aperture positioned directly in front of said screen, said first inclined mirror being slidably mounted upon said first and second guide bars for said sliding motion, and being movable between said first position in front of and overlapping said camera housing front opening so as to block said opening and a second position laterally displaced from said opening to allow light from said video monitor screen to pass through said opening, said auxiliary camera module being detachably mounted to said camera housing front panel and having a lens axially aligned with said camera housing front panel opening.

11. A multiple image color camera comprising a housing,
a black-and-white video monitor in said housing having a screen forming images to be photographed,
optical means mounted to said housing for transmitting light from the screen along a bent optical path having an output axis, said optical means comprising,
a lens mounted in said optical path, said lens having a plurality of lens elements,
a filter assembly having a rotatably mounted multi-element filter disc extending between two of said lens elements, said disc having a plurality of circumferentially spaced filter elements adapted to be selectively positioned between said two lens elements as the disc rotates,
motor means for rotating the disc,
means for supporting film in a plane perpendicular to said output axis and adjacent said monitor,
means for effecting relative displacement of said film and said monitor perpendicular to said output axis,
said optical means including a first mirror positioned in said optical path for reflecting light from the screen in a first direction angularly oriented relative to a perpendicular to the screen,
a camera module,
means for mounting said camera module to said housing in position to photograph said video monitor screen, said mirror being interposed between said camera module and said screen, and
means for mounting said mirror to said housing for motion between a first position in which it reflects light from the monitor along said optical path in said first direction and in which the mirror blocks passage of light from the screen to said camera module, and a second position in which the mirror does not interefere with passage of light from the screen to the camera module.

12. The multi-color camera of claim 11 including a second lens for transmitting light from the screen to the camera module, said lens having a plurality of second lens elements, a second filter assembly having a second rotatably mounted multi-element filter disc extending between two of said second lens elements, and second motor means for rotating said second disc.

13. A multiple image color camera comprising a housing,
a black-and-white video monitor in said housing having a screen forming images to be photographed,
optical means mounted to said housing for transmitting light from the screen along a first optical path having an output axis, said optical means comprising,
a lens mounted in said optical path, said lens having a plurality of lens elements, a filter assembly having a rotatably mounted multi-element filter disc extending between two of said lens elements, said disc having a plurality of circumferentially spaced filter elements adapted to be selectively positioned between said two lens elements as the disc rotates, motor means for rotating the disc, means for supporting film in a plane perpendicular to said output axis and adjacent said monitor, means for effecting relative displacement of said film and said monitor, said optical means including a first mirror positioned in said first optical path for reflecting light from the screen along said first optical path, second film supporting means mounted to said housing, second optical means mounted to said housing for transmitting light from the screen along a second optical path to film supported by said second film supporting means, and means for mounting said mirror to said housing for motion between a first position in which it reflects light from the monitor along said first optical path and in which the mirror blocks passage of light from the screen along said second optical path, and a second position in which the mirror does not interfere with with passage of light from the screen along said second optical path.

14. A multiple image color camera comprising a housing, a black-and-white video monitor in said housing having a screen forming images to be photographed, optical means mounted to said housing for transmitting light from the screen along a bent optical path having an output axis, means for supporting film in a plane perpendicular to said output axis and adjacent said monitor, means for effecting relative displacement of said film and said monitor said optical means including a first mirror positioned in said bent optical path for reflecting light from the screen along said bent optical path, second film supporting means mounted to said housing, second optical means mounted to said housing for transmitting light from the screen to said second film supporting means, and means for mounting said mirror to said housing for motion between a first position in which it reflects light from the monitor along said bent optical path and in which the mirror blocks passage of light from the screen to said second film supporting means, and a second position in which the mirror does not interfere with passage of light from the screen to said second film supporting means.

* * * * *